(12) United States Patent
Yang et al.

(10) Patent No.: US 11,914,864 B2
(45) Date of Patent: Feb. 27, 2024

(54) STORAGE DEVICE AND METHOD OF DATA MANAGEMENT ON A STORAGE DEVICE

(71) Applicant: SAMSUNG ELECTRONICS CO., LTD., Suwon-si (KR)

(72) Inventors: Jing Yang, San Jose, CA (US); Jingpei Yang, San Jose, CA (US); Rekha Pitchumani, Oak Hill, VA (US); Sungwook Ryu, Palo Alto, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 0 days.

(21) Appl. No.: 17/408,031

(22) Filed: Aug. 20, 2021

(65) Prior Publication Data

US 2023/0004303 A1 Jan. 5, 2023

Related U.S. Application Data

(60) Provisional application No. 63/217,735, filed on Jul. 1, 2021.

(51) Int. Cl.
*G06F 3/06* (2006.01)

(52) U.S. Cl.
CPC .......... *G06F 3/0613* (2013.01); *G06F 3/0635* (2013.01); *G06F 3/0659* (2013.01); *G06F 3/0679* (2013.01)

(58) Field of Classification Search
CPC .... G06F 3/0634; G06F 3/0613; G06F 3/0635; G06F 3/0659; G06F 3/0679;

(Continued)

(56) References Cited

U.S. PATENT DOCUMENTS

| 5,247,671 A | 9/1993 | Adkins et al. |
| 7,882,320 B2 | 2/2011 | Caulkins |

(Continued)

FOREIGN PATENT DOCUMENTS

| CN | 110704195 A | 1/2020 |
| CN | 110780999 A | 2/2020 |

(Continued)

OTHER PUBLICATIONS

Lee, Hee Won et al., MIST: Mitigating Host-side Interference for Storage Traffic in Virtualized Data Centers, 2016 IEEE 9th International Conference on Cloud Computing, 9 pages.

(Continued)

*Primary Examiner* — Ernest Unelus
(74) *Attorney, Agent, or Firm* — Lewis Roca Rothgerber Christie LLP

(57) ABSTRACT

A storage device includes non-volatile memory, a storage controller including a first controller processor connected to the non-volatile memory, and a second controller processor connected to the non-volatile memory, and shared memory to store a mapping table. The shared memory may be connected to the first controller processor and the second controller processor to share mapping table information between the first controller processor and the second controller processor. The storage controller may set a power mode of the first controller processor and the second controller processor based on an input/output intensity.

18 Claims, 10 Drawing Sheets

(58) Field of Classification Search
CPC .............. G06F 1/3275; G06F 1/3287; G06F 2212/1028; H04L 12/40039; H04L 12/40013; H04L 12/0292; G11C 16/30; G11C 5/14

See application file for complete search history.

(56) References Cited

U.S. PATENT DOCUMENTS

| | | | |
|---|---|---|---|
| 7,930,468 | B2 | 4/2011 | Caulkins |
| 8,041,914 | B2 | 10/2011 | Fukatani et al. |
| 10,042,750 | B2 | 8/2018 | Roberts et al. |
| 10,416,897 | B2 | 9/2019 | Jin et al. |
| 10,466,938 | B2 | 11/2019 | Seo et al. |
| 10,642,764 | B1 | 5/2020 | Gerhart et al. |
| 10,884,482 | B2 | 1/2021 | King et al. |
| 2017/0269860 | A1* | 9/2017 | Geml .............. G06F 3/0634 |
| 2017/0277446 | A1* | 9/2017 | Cheong ........... G06F 3/0634 |
| 2019/0310892 | A1 | 10/2019 | Frolikov |
| 2020/0218676 | A1 | 7/2020 | Cao et al. |
| 2020/0301860 | A1 | 9/2020 | Hsu et al. |
| 2020/0341791 | A1 | 10/2020 | Tsirkin |
| 2021/0129779 | A1* | 5/2021 | Kim .............. B60R 16/033 |
| 2021/0232504 | A1* | 7/2021 | Boyd ............. G06F 12/0882 |
| 2022/0180915 | A1* | 6/2022 | Kim ............... G11C 16/30 |

FOREIGN PATENT DOCUMENTS

| | | |
|---|---|---|
| CN | 111580639 A | 8/2020 |
| CN | 111966208 A | 11/2020 |
| CN | 112463028 A | 3/2021 |

OTHER PUBLICATIONS

Gupta, Aayush, Towards Smarter Flash-Based Storage Management for Enterprise Workloads, a Dissertation in Computer Science and Engineering, The Pennsylvania State University Graduate School, College of Engineering, Dec. 2012, 138 pages.

* cited by examiner

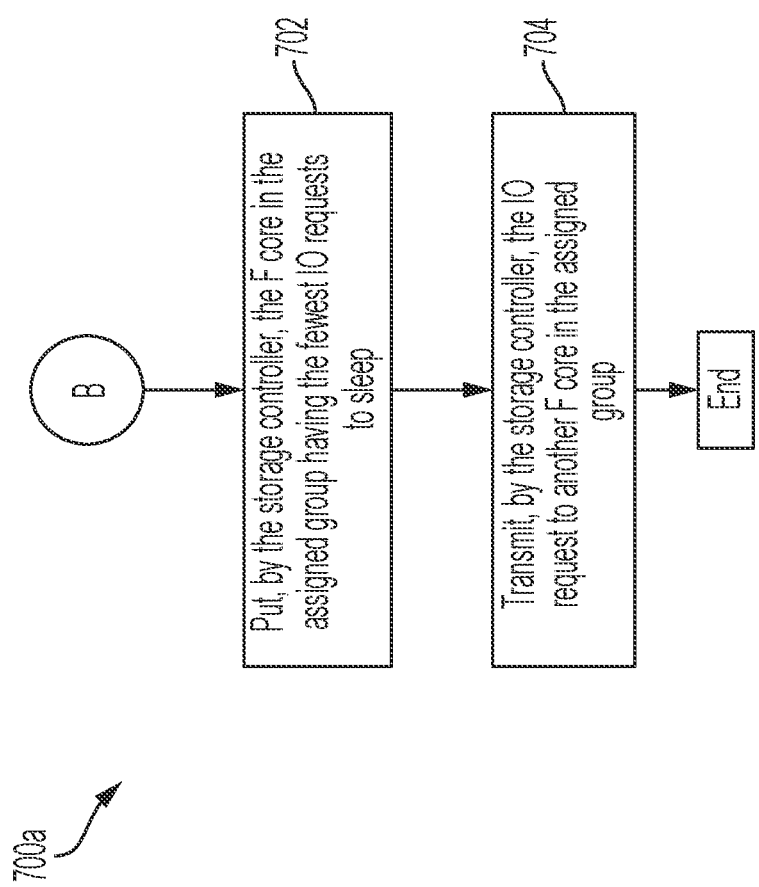

STORAGE DEVICE AND METHOD OF DATA MANAGEMENT ON A STORAGE DEVICE

CROSS-REFERENCE TO RELATED APPLICATION(S)

This application claims priority to and the benefit of U.S. Provisional Application No. 63/217,735, filed on Jul. 1, 2021, entitled "METHOD FOR POWER EFFICIENT DATA MANAGEMENT ON MULTI-FCPU SSD" the entire content of which is incorporated by reference herein.

FIELD

Aspects of some embodiments of the present disclosure relate to a storage device and a method of data management on a storage device.

BACKGROUND

Generally, as the amount of data stored or to be stored in storage devices increases, storage devices handle a growing number of user requests. A larger number of user requests within a shorter time frame may result in increased workloads. Further, due to the wide variety of user requests received under varying conditions, allocation of the user requests in a storage device may result in uneven workloads. As the imbalance between workloads increases, issues with the storage devices may be exacerbated.

The above information disclosed in this Background section is for enhancement of understanding of the background of the present disclosure, and therefore, it may contain information that does not constitute prior art.

SUMMARY

Storage devices may include multiple embedded cores. Each embedded core may control a set number of memory channels using separate mapping tables. Workloads may be distributed among the embedded cores using a particular approach to estimate even workload distribution across all of the embedded cores. For example, a round robin approach may be used.

While a round robin approach may be appropriate for a uniform, random distribution of incoming user requests, such a pattern of incoming requests may not always be present. Depending on the pattern of incoming requests and the distribution approach, some of the embedded cores may be active while other embedded cores may be idle. However, all of the embedded cores may be awake regardless of device status even if the embedded cores are idle, which may lead to excessive power consumption.

One or more embodiments of the present disclosure are directed to a storage device with improved power-efficiency, resource utilization, and/or dynamic management of input/output (IO) operations, and a method including the same.

According to some embodiments of the present disclosure, a storage device includes non-volatile memory, a storage controller including a first controller processor connected to the non-volatile memory, and a second controller processor connected to the non-volatile memory, and shared memory to store a mapping table (e.g., to store a logical to physical address mapping table and controller processor information), the shared memory being connected to the first controller processor and the second controller processor to share mapping table information between the first controller processor and the second controller processor. The storage controller may set a power mode of the first controller processor and the second controller processor based on an input/output intensity.

In an embodiment, the non-volatile memory may include a first memory chip connected to a first channel, and a second memory chip connected to a second channel. The first controller processor and the second controller processor may be connected to the first memory chip via the first channel and the second memory chip via the second channel.

In an embodiment, the storage controller may adjust the channels controlled by the first controller processor and the second controller processor.

In an embodiment, the storage controller may assign a first number of channels to the first controller processor and a second number of channels to the second controller processor during a first time period, the first number of channels being different from the second number of channels.

In an embodiment, the IO intensity may correspond to IO per second (IOPS).

In an embodiment, the storage controller may put the first controller processor or the second controller processor in a sleep mode (e.g., a state in which activities are suspended to save power) or a lower frequency mode in response to the IOPS being below a first threshold.

In an embodiment, the storage controller may put the controller processor having a lower number of queued IO requests from among the first controller processor and the second controller processor in the sleep mode (e.g., the state in which activities are suspended to save power) or the lower frequency mode in response to IOPS being below the first threshold.

In an embodiment, the storage controller may assign a background task to the first controller processor in response to IOPS being below a first threshold.

In an embodiment, the storage controller may reduce the first threshold in response to assigning the background task to the first controller processor.

In an embodiment, the storage controller is configured to set the power mode of the first controller processor and the second controller processor based on IO intensity in accordance with a command received from a power manager of a host based on the IO intensity detected by a workload detector of the host.

According to some embodiments of the present disclosure, a method of data management includes receiving, at a host interface layer of a storage controller, an IO request from a host device, determining, by the storage controller, an IO intensity, determining, by the storage controller, a group of controller processors for the IO request, the group of controller processors being connected to non-volatile memory corresponding to the IO request and being connected to shared memory to share mapping table information, and changing, by the storage controller, a first controller processor from among the group of controller processors to operate at a set power mode based on the IO intensity.

In an embodiment, the first controller processor and a second controller processor of the group of controller processors may be connected to a first memory chip of the non-volatile memory via a first channel and a second memory chip of the non-volatile memory via a second channel.

In an embodiment, the method may include adjusting, by the storage controller, the channels controlled by the first controller processor and the second controller processor.

In an embodiment, the method may include assigning, by the storage controller, a first number of channels to the first controller processor during a first time period and a second number of channels to the second controller processor during the first time period, the first number of channels being different from the second number of channels.

In an embodiment, the IO intensity may correspond to IOPS.

In an embodiment, the method may include putting, by the storage controller, the first controller processor or a second controller processor of the group of controller processors in a sleep mode (e.g., a state in which activities are suspended to save power) or a lower frequency mode in response to IOPS being below a first threshold.

In an embodiment, the putting, by the storage controller, the first controller processor or the second controller processor in the sleep mode (e.g., the state in which activities are suspended to save power) or the lower frequency mode in response to IOPS being below the first threshold comprises putting the controller processor having a lower number of queued IO requests from among the first controller processor and the second controller processor in the sleep mode (e.g., the state in which activities are suspended to save power) or the lower frequency mode.

In an embodiment, the method may include assigning, by the storage controller, a background task to the first controller processor of the group of controller processors in response to IOPS being below a first threshold.

In an embodiment, the method may include reducing, by the storage controller, the first threshold in response to the assigning, by the storage controller, the background task to the first controller processor.

According to some embodiments of the present disclosure, a storage device includes non-volatile memory, a first controller processor connected to the non-volatile memory, a second controller processor connected to the non-volatile memory, a workload detector configured to detect IO intensity, a power manager configured to set a power mode of the first controller processor and the second controller processor based on the IO intensity, to change the first controller processor and the second controller processor to operate in a low power mode in response to the workload detector detecting an IO intensity between a first threshold and a second threshold for a first period of time, the second threshold being lower than the first threshold, and to put the first controller processor in a sleep mode (e.g., a state in which activities are suspended to save power) in response to the workload detector detecting the IO intensity below the second threshold for a second period of time different from the first period of time, and shared memory to store a mapping table (e.g., to store a logical to physical address mapping table and controller processor information), the shared memory being connected to the first controller processor and the second controller processor to share mapping table information between the first controller processor and the second controller processor.

BRIEF DESCRIPTION OF THE DRAWINGS

The above and other aspects and features of the present disclosure will be more clearly understood from the following detailed description of the illustrative, non-limiting example embodiments with reference to the accompanying drawings.

FIG. 7A illustrates a flow chart of various processes of a method of data management according to the method of FIG. 5 where a processor may be put in sleep mode, according to some embodiments of the present disclosure.

DETAILED DESCRIPTION

Figure 1:
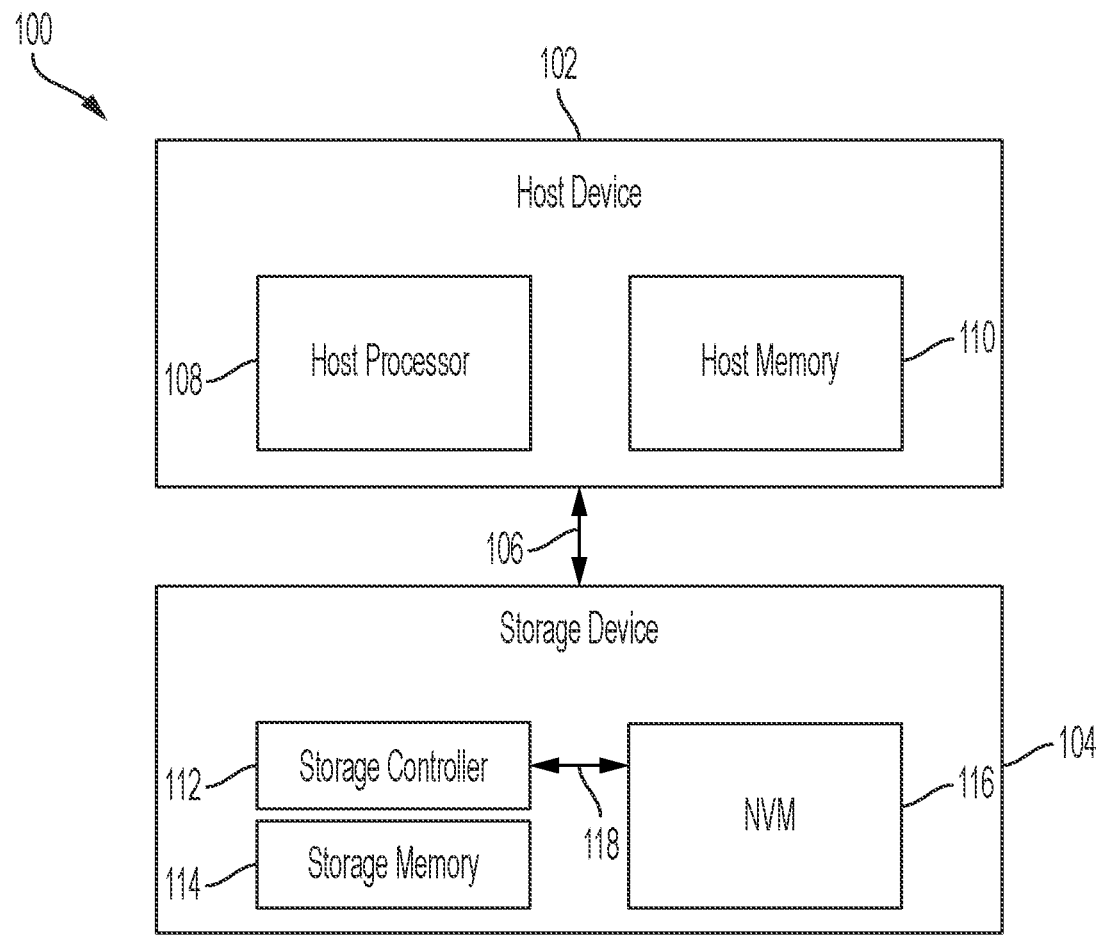
FIG. 1 illustrates a storage system, according to some embodiments of the present disclosure.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, description thereof may not be repeated.

Generally, a storage device including multiple embedded cores may perform data management tasks (e.g., read/write operations) in non-volatile memory, where each core may be connected to the non-volatile memory through a same number of dedicated channels that are managed via its own flash translation layer mapping table. Depending on a data access pattern and data block distribution algorithms, some embedded cores may be idle while other embedded cores may be busy performing the data management tasks. In this case, however, because the idle cores may still be active, power consumption of the storage device may be unnecessarily increased.

According to some embodiments of the present disclosure, a storage device may include a plurality of controller processors that are connected to the same channels as each other to access the non-volatile memory via a shared flash translation layer mapping table that is stored in shared memory (e.g., a shared random access memory (RAM), for example, such as a dual-port RAM). By sharing the flash translation layer mapping table in the shared memory, the plurality of controller processors may, at different time periods from each other, manage IO requests transmitted through the same channels. Further, the power/frequency mode of the plurality of controller processors, tasks assigned to each of the plurality of controller processors, and channels controlled by the plurality controller processors may be selectively adjusted by a storage controller according to (e.g., based on) various suitable configurations and evaluations, for example, such as user configurations, capabilities, power modes, IO intensity (e.g., IO per second (IOPS) or any other suitable measure of IOs over a time period), offline tasks (e.g., background tasks, pre-processing of data for a host, and/or the like), and availability of other hardware automation routes (e.g., other available controller processors) to serve the user request.

For example, the storage device may include a storage controller that evaluates the status and capabilities of the controller processors, IO intensity, and/or the like to selectively change the frequency and/or power modes of the controller processors to increase power efficiency. For example, the storage controller may determine that a sleep mode (e.g., a mode in which activities are suspended to save power) or a low frequency/power mode may be appropriate in the case of low IO intensity to increase power efficiency, and a high frequency/power mode may be appropriate in the case of high IO intensity to increase throughput. The storage controller may also adjust (e.g., logically adjust) the number of channels controlled by a particular one of the controller processors sharing the flash translation layer mapping table to reduce latency, avoid flash contention, and/or the like, while also providing flexibility associated with multiple controller processors managing non-volatile memory (e.g., flash memory) via the same channels based on the shared flash translation layer mapping table.

Further, when IO intensity is relatively low, the storage controller may assign a controller processor (e.g., an idle controller processor) offline tasks (e.g., background tasks such as wear-leveling and garbage collection) while another controller processor (e.g., an active controller processor) handles inbound IO requests. By performing background tasks during a relatively low IO intensity period, storage device performance may be improved. As another example, when IO intensity is relatively low, the storage controller may assign a controller processor (e.g., an idle controller processor) data pre-processing tasks that would otherwise be performed by the host device thereby enabling additional functionality for the controller processors (e.g., providing multi-functional controller processors), or may put the idle controller processor to sleep.

Moreover, according to some embodiments of the present disclosure, the above-described IO intensity detection and decision-making functionality of the storage controller may be offloaded to the host device, thereby reducing the form factor of the storage controller. As used herein, IO intensity may refer to a number of IO requests per unit time.

FIG. 1 illustrates a storage system, according to some embodiments of the present disclosure.

Referring to FIG. 1, a storage system 100 may include a host device 102 and a storage device 104. In some embodiments, the host device 102 may be housed with the storage device 104, and in other embodiments, the host device 102 may be separate from the storage device 104. The host device 102 may include any suitable computing device connected to a storage device 104 such as, for example, a personal computer (PC), a portable electronic device, a hand-held device, a laptop computer, or the like.

The host device 102 may be connected to the storage device 104 over a host interface 106. The host device 102 may issue data request commands or IO commands (e.g., READ/WRITE commands) to the storage device 104 over the host interface 106, and may receive responses from the storage device 104 over the host interface 106.

The host device 102 may include a host processor 108 and host memory 110. The host processor 108 may be a processing circuit, for example, such as a general purpose processor or a central processing unit (CPU) core of the host device 102. The host processor 108 may be connected to other components via an address bus, a control bus, a data bus, and/or the like. The host memory 110 may be considered as high performing main memory (e.g., primary memory) of the host device 102. For example, in some embodiments, the host memory 110 may include (or may be) volatile memory, for example, such as dynamic random-access memory (DRAM). However, the present disclosure is not limited thereto, and the host memory 110 may include (or may be) any suitable high performing main memory (e.g., primary memory) replacement for the host device 102 as would be known to those skilled in the art. For example, in other embodiments, the host memory 110 may be relatively high performing non-volatile memory, such as NAND flash memory, Phase Change Memory (PCM), Resistive RAM, Spin-transfer Torque RAM (STTRAM), any suitable memory based on PCM technology, memristor technology, and/or resistive random access memory (ReRAM), and can include, for example, chalcogenides, and/or the like.

The storage device 104 may be considered as secondary memory that may persistently store data accessible by the host device 102. In this context, the storage device 104 may include relatively slower memory when compared to the high performing memory of the host memory 110. For example, in some embodiments, the storage device 104 may be secondary memory of the host device 102, for example, such as a Solid-State Drive (SSD). However, the present disclosure is not limited thereto, and in other embodiments, the storage device 104 may include (or may be) any suitable storage device such as, for example, a magnetic storage device (e.g., a hard disk drive (HDD), and the like), an optical storage device (e.g., a Blue-ray disc drive, a compact disc (CD) drive, a digital versatile disc (DVD) drive, and the like), other kinds of flash memory devices (e.g., a USB flash drive, and the like), and/or the like. In various embodiments, the storage device 104 may conform to a large form factor standard (e.g., a 3.5 inch hard drive form-factor), a small form factor standard (e.g., a 2.5 inch hard drive form-factor), an M.2 form factor, an E1.S form factor, and/or the like. In other embodiments, the storage device 104 may conform to any suitable or desired derivative of these form factors. For convenience, the storage device 104 may be described hereinafter in the context of an SSD, but the present disclosure is not limited thereto.

The storage device 104 may be communicably connected to the host device 102 over the host interface 106. The host interface 106 may facilitate communications (e.g., using a connector and a protocol) between the host device 102 and the storage device 104. In some embodiments, the host interface 106 may facilitate the exchange of storage requests and responses between the host device 102 and the storage device 104. In some embodiments, the host interface 106 may facilitate data transfers by the storage device 104 to and from the host memory 110 of the host device 102. For example, in various embodiments, the host interface 106

(e.g., the connector and the protocol thereof) may include (or may conform to) Small Computer System Interface (SCSI), Non Volatile Memory Express (NVMe), Peripheral Component Interconnect Express (PCIe), remote direct memory access (RDMA) over Ethernet, Serial Advanced Technology Attachment (SATA), Fiber Channel, Serial Attached SCSI (SAS), NVMe over Fabric (NVMe-oF), and/or the like. In other embodiments, the host interface 106 (e.g., the connector and the protocol thereof) may include (or may conform to) various general-purpose interfaces, for example, such as Ethernet, Universal Serial Bus (USB), and/or the like.

In some embodiments, the storage device 104 may include a storage controller 112, storage memory 114, non-volatile memory (NVM) 116, and a storage interface 118. The storage memory 114 may be high-performing memory of the storage device 104, and may include (or may be) volatile memory, for example, such as DRAM, but the present disclosure is not limited thereto, and the storage memory 114 may be any suitable kind of high-performing volatile or non-volatile memory. The NVM 116 may persistently store data received, for example, from the host device 102. The NVM 116 may include, for example, NAND flash memory, but the present disclosure is not limited thereto, and the NVM 116 may include any suitable kind of memory for persistently storing the data according to an implementation of the storage device 104 (e.g., magnetic disks, tape, optical disks, and/or the like).

The storage controller 112 may be connected to the NVM 116 over the storage interface 118. In the context of the SSD, the storage interface 118 may be referred to flash channel, and may be an interface with which the NVM 116 (e.g., NAND flash memory) may communicate with a processing component (e.g., the storage controller 112) or other device. Commands such as reset, write enable, control signals, clock signals, and/or the like may be transmitted over the storage interface 118. Further, a software interface may be used in combination with a hardware element that may be used to test/verify the workings of the storage interface 118. The software may be used to read data from and write data to the NVM 116 via the storage interface 118. Further, the software may include firmware that may be downloaded onto hardware elements (e.g., for controlling write, erase, and read operations).

The storage controller 112 may be connected to the host interface 106, and may manage signaling over the host interface 106. In some embodiments, the storage controller 112 may include an associated software layer (e.g., a host interface layer) to manage the physical connector of the host interface 106. The storage controller 112 may respond to IO requests received from the host device 102 over the host interface 106. The storage controller 112 may also manage the storage interface 118 to control, and to provide access to and from, the NVM 116. For example, the storage controller 112 may include at least one processing component embedded thereon for interfacing with the host device 102 and the NVM 116. The processing component may include, for example, a digital circuit (e.g., a microcontroller, a microprocessor, a digital signal processor, or a logic device (e.g., a field programmable gate array (FPGA), an application-specific integrated circuit (ASIC), and/or the like)) capable of executing data access instructions (e.g., via firmware and/or software) to provide access to and from the data stored in the NVM 116 according to the data access instructions. For example, the data access instructions may correspond to the data request commands, and may include any suitable data storage and retrieval algorithm (e.g., READ/WRITE/ERASE) instructions, and/or the like.

Figure 2:
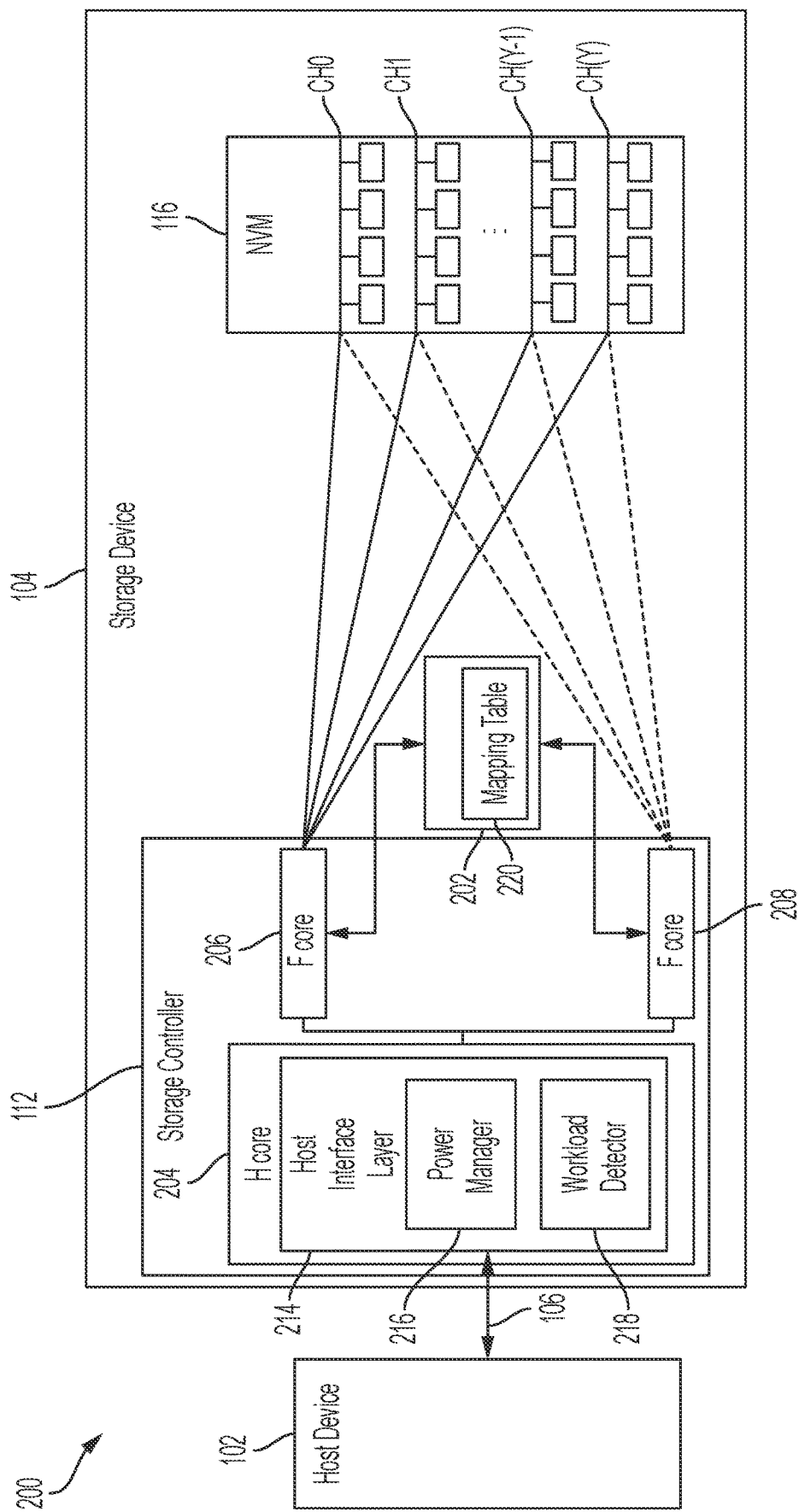
FIG. 2 illustrates a host device and a storage device included in a storage system, according to some embodiments of the present disclosure.

FIG. 2 illustrates a host device and a storage device included in a storage system 200, according to some embodiments of the present disclosure.

Referring to FIG. 2, the storage device 104 may include a storage controller 112, NVM 116, and shared memory 202. The shared memory 202 may include any suitable RAM (e.g., DRAM, SRAM, or the like). In some embodiments, the shared memory 202 may be part of the storage memory 114 shown in FIG. 1. However, the present disclosure is not limited thereto. For example, the shared memory 202 may be memory separate from the storage memory 114 shown in FIG. 1.

The storage controller 112 may include a plurality of processors (e.g., a plurality of embedded cores) including a host interface processor (H core) 204 and two or more controller processors or flash translation layer processors (F cores) including a first F core 206 and a second F core 208. In some embodiments, the two or more controller processors or F cores may include homogenous processors (e.g., processors of the same type as each other) and/or heterogenous processors (e.g., processors of a different type from each other such that one processor is more powerful processor than another processor). For example, the first F core 206 and the second F core 208 may be the same type of processor as each other or may be different types of processors from each other. The H core 204 may manage the host interface layer 214, and may correspond to software/firmware configured to process commands received from the host device 102 over the host interface 106. The first F core 206 and the second F core 208 may include the same or substantially similar software and/or firmware, and may manage the storage interface 118 (e.g., the flash translation layer) by executing data access requests from the host device 102 in the NVM 116, and mapping logical block addresses to physical addresses of the NVM 116 (e.g., flash memory). The first F core 206 and/or the second F core 208 may also manage data storage by performing garbage collection, wear-leveling, bad block management, and/or the like.

In some embodiments, the H core 204 may include, at the host interface layer 214, a power manager 216 and a workload detector 218. The workload detector 218 may determine IO intensity by detecting, individually and/or in combination, an input-output (IO) intensity or rate (e.g., IO per second (IOPS)) of the F cores (e.g., the first F core 206 and the second F core 208) of the storage controller 112. Based on the IO intensity determined by the workload detector 218, the power manager 216 may compare the IO intensity to one or more thresholds to determine whether one or more F cores (e.g., the first F core 206 and/or the second F core 208) should be in a sleep mode, a low frequency/power mode, a high frequency/power mode, or the like to improve power-efficiency.

In addition, the power manager 216 may distribute IO requests in accordance with the power/frequency mode of one or more F cores. For example, the power manager 216 may distribute IO requests among particular F cores (e.g., selectively distribute IO requests among awake F cores as opposed to sleeping F cores) and, in some embodiments, the power manager 216 may redistribute queued IO requests between the F cores (e.g., redistribute IO requests from F cores put to sleep to the awake F cores). Accordingly, because the power manager 216 may have access to IO intensity via the workload detector 218, may have access to the status and capabilities of the one or more F cores (e.g., the first F core 206 and/or the second F core 208), and may control IO request distribution, the power manager 216 may effectively coordinate data management between the F cores (e.g., the first F core 206 and/or the second F core 208) to provide improved power-efficiency.

For example, in some embodiments, when the IO intensity is below a first threshold for a period of time, the power manager 216 may put the F core having a lower number of queued IO requests (e.g., the fewest queued IO requests) from among a group of F cores to sleep (e.g., the power manager 216 may put a first F core 206 in sleep mode while the second F core 208 remains awake). In this case, prior to putting the first F core 206 to sleep, the power manager 216 may either redistribute the IO requests queued for the first F core 206 to the second F core 208 or may put the first F core 206 in the sleep mode after all of its queued IO requests are completed. In another embodiment, when the IO intensity is below a first threshold for a period of time, the power manager 216 may assign background tasks to the F core having the fewest queued IO requests from among a group of F cores, for example, such as, wear-leveling, resolving data retention, advanced garbage collection activity, and data re-balancing, as discussed in more detail below. The power manager 216 may further distribute inbound IO requests to F cores from among the group of F cores that may be awake (e.g., the second F core 208). Accordingly, power may be saved relative to a comparative example where the first F core 206 has idle periods in accordance with the IO intensity being below the first threshold.

During a subsequent time period, when inbound IO requests are above the first threshold for a period of time, the power manager 216 may wake up the first F core 206 to start receiving IO requests. In some embodiments, after waking up the first F core 206 from the sleep mode, the power manager 216 may begin to assign inbound IO requests to the first F core 206. For example, the power manager 216 may assign inbound IO requests to the first F core 206 (e.g., assign more of the inbound IO requests to the first F core 206 compared to the second F core 208 to balance the workload), may redistribute tasks from the second F core 208 to the first F core 206, and/or the like.

The power manager 216 also has the option to set the first F core 206 and the second F core 208 to operate at different power/frequency modes in accordance with the IO intensity relative to one or more thresholds. For example, the power manager 216 may set the first F core 206 to operate at a low power/frequency mode and the second F core 208 to operate at a high power/frequency mode, set both the first F core 206 and the second F core 208 to operate at the low power/frequency mode, or set both the first F core 206 and the second F core 208 to operate at the high power/frequency mode depending on the IO intensity relative to a plurality of thresholds.

In some embodiments, the power manager 216 may further coordinate shared data management activities between the F cores. For example, the power manager 216 may assign offline tasks (e.g., background tasks) other than data mapping (e.g., tasks other than host command driven tasks) to an F core. Some non-limiting examples of background tasks include, for example, wear-leveling, resolving data retention, advanced garbage collection activity, and re-balancing data among F cores (e.g., the first F core 206 and/or the second F core 208) for reduced tail latency, balanced GC overhead, improved parallelism, and/or the like.

In some embodiments, when the IO intensity is below the first threshold for a period of time, the power manager 216 may check whether any offline tasks should be performed to potentially improve performance of the storage device, and may assign such tasks to the first F core 206 instead of putting the first F core 206 to sleep or letting the first F core 206 idle for a period of time. Because the power manager 216 assigns offline tasks (e.g., background tasks) to one or more F cores (e.g., the first F core 206 and/or the second F core 208) based on the IO intensity, offline tasks (e.g., background tasks) may be performed during a time period reducing disruption of data mapping.

For example, garbage collection in a comparative storage device may simply occur when available space in the comparative storage device is running out. Because the comparative storage device may not be aware of future IO requests, a user experience may be adversely affected when garbage collection occurs at the same time or concurrently with a period of increased IO intensity as throughput thereof may be reduced while the garbage collection is being performed.

In some embodiments, when the IO intensity is below the first threshold for a period of time, the power manager 216 may identify and assign data pre-processing tasks to the first F core 206 to offload processing from the host device 102, thereby providing an opportunity for expanded functionality of the first F core 206. For example, if the host device 102 requests the combined result of two data entries, the F core that is assigned the corresponding data pre-processing task may perform an add function of the two data entries prior to sending the result to the host device 102. In contrast, in a comparative example, the host device 102 may perform the add function after receiving the raw data from the F core. Accordingly, a computing burden of the host device 102 may be reduced by using the computing power of the F core.

As used herein, a "channel" such as one of CH0 to CH(Y) shown in FIG. 2 refers to an interface (e.g., the storage interface 118 shown in FIG. 1) between the F cores of the storage controller 112 and the NVM 116. Generally, the power manager 216 may coordinate data management activities between two or more F cores (e.g., the first F core 206 and the second F core 208) in accordance with two or more F cores being connected to the same plurality of channels.

For example, the first F core 206 and the second F core 208 of the storage controller 112 may be connected to the NVM 116 via the same plurality of channels CH0 to CH(Y) (e.g., a same plurality of memory channels) of the storage interface 118. Each channel may be connected to one or more memory chips of the NVM (e.g., one or more NAND chips) 116. Therefore, the first F core 206 and the second F core 208 may be connected to and may share control of the same channels (e.g., share control of the channels CH0 . . . CH(Y) at different points in time) or different ones from among the channels CH0 . . . CH(Y).

As used herein, "channels CH0 . . . CH(Y)" indicates that the first F core 206 and the second F core 208 may be connected to and share control of any suitable number of channels (e.g., Y number of channels). In some embodiments, the first F core 206 and the second F core 208 may be connected to and share control of eight channels CH0 to CH7. In other embodiments, the first F core 206 and the second F core 208 may be connected to and share control of more or less than eight channels.

Although FIG. 2 depicts the first F core 206 and the second F core 208 as connected to channels CH0 . . . CH(Y), the first F core 206 and the second F core 208 may be adjusted (e.g., dynamically adjusted), by the power manager 216, to control different ones of the channels CH0 . . . CH(Y) for a period of time depending on the power mode of the first F core 206 and the second F core 208. For example, if the first F core 206 is in sleep mode and the second F core 208 is awake, then the second F core 208 may control all of the channels CH0 . . . CH(Y). As another example, if the first F core 206 is awake and the second F core 208 is in sleep mode, then the first F core 206 may control all of the channels CH0 . . . CH(Y). As an additional example, if both the first F core 206 and the second F core 208 are awake, the first F core 206 and the second F core 208 may control separate ones of the channels CH0 . . . CH(Y) (e.g., the control of the channels CH0 . . . CH(Y) may be divided (e.g., may be evenly divided) amongst the number of awake F cores connected to the same shared memory 202) to work independently and avoid or reduce flash channel contention. For example, in the case of eight channels where both the first F core 206 and the second F core 208 are awake, the first F core 206 may control a first set of channels CH0 . . . CH3 and the second F core 208 may control a second set of channels CH4 . . . CH7. However, the present disclosure is not limited thereto. In some embodiments, the first F core 206 and the second F core 208 may control different numbers of channels from each other as set by the power manager 216 even when the first F core 206 and the second F core 208 are both awake. Accordingly, because each channel is controlled by a single F core at a given time, there may be reduced latency overhead as flash contention may be avoided or reduced.

Although flash channel contention may be reduced by the power manager 216 designating each channel to be controlled by a single F core at a given time, in some embodiments, flash contention may still occur when, for example, a first F core 206 is running offline tasks (e.g., background tasks) and a second F core 208 is handling IO requests. In this case, because the first F core 206 is instructed to perform offline tasks (e.g., background tasks) when IO intensity (e.g., IO per second (IOPS) or any other suitable measure of IOs over a time period) is below a threshold, latency overhead (e.g., due to flash contention) may be relatively low because the currently detected workload is relatively light as indicated by the IO intensity being below the threshold.

Because the first F core 206 and the second F core 208 may share control over the same channels CH0 . . . CH(Y) at different times, the first F core 206 and the second F core 208 may share data with each other. For example, as shown in FIG. 2, the first F core 206 and the second F core 208 may be connected to separate ports of the shared memory 202. In this case, the shared memory 202 may be dual-port RAM. However, the present disclosure is not limited thereto. For example, in some embodiments, the shared memory 202 may contain additional ports such as, for example, three, four, or more ports for connection to more than two F cores.

In more detail, the first F core 206 and the second F core 208 may share a mapping table stored in the shared memory 202. The mapping table 220 provides flash translation layer data access, synchronization, and sharing between the first F core 206 and the second F core 208. For example, when the first F core 206 or the second F core 208 receives a command (e.g., a write command) from the host device 102, data may be written to an address of the NVM 116. Upon completion of the command (e.g., the write command), metadata (e.g., metadata including the physical locations corresponding to logical locations specified by the write command of the host device 102) is stored in the mapping table 220. Therefore, the mapping table 220 include metadata entries identifying logical to physical locations to be shared between F cores connected to the same shared memory 202. As such, because the first F core 206 and the second F core 208 share the mapping table 220, the metadata may not need to be migrated or separately communicated from the first F core 206 to the second F core 208 and vice versa.

Although only two F cores are depicted as connected to the shared memory 202 in FIG. 2, depending on the number of ports of the shared memory 202, more than two F cores may be connected to the shared memory 202, and therefore, more than two F cores may be connected to and share control of channels CH0 . . . CH(Y). Further, any suitable number of F cores and shared memory chips may be present in the storage device 104 with suitable changes to the interfaces between the components.

Figure 3:
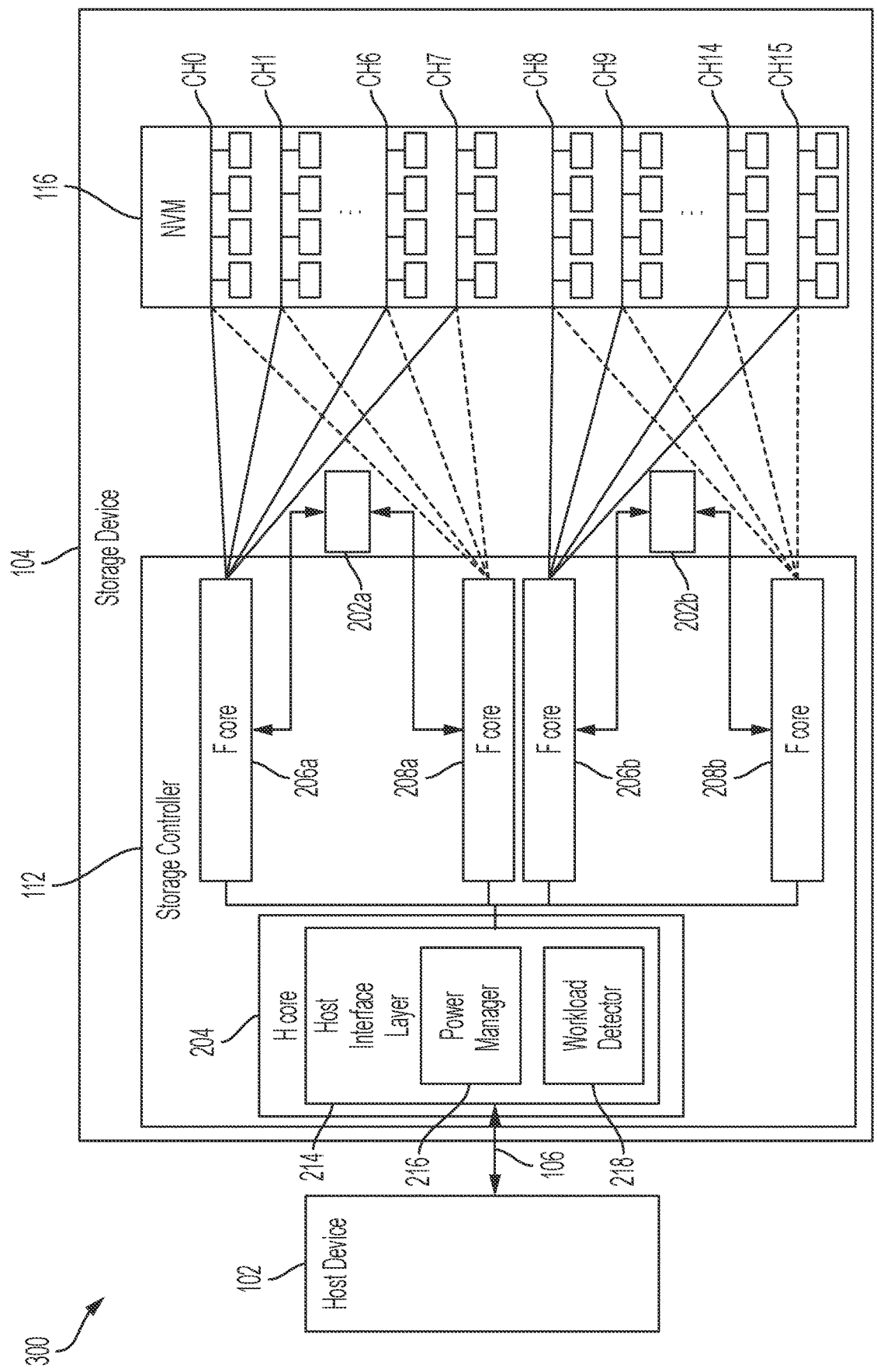
FIG. 3 illustrates a host device and a storage device included in a storage system, according to some embodiments of the present disclosure.

FIG. 3 illustrates a host device and a storage device included in a storage system 300, according to some embodiments of the present disclosure.

Referring to FIG. 3, the storage device 104 may include a storage controller 112 including a plurality of F cores including a first F core 206a, a second F core 208a, a third F core 206b, and a fourth F core 208b. The first F core 206a and the third F core 206b may operate in the same or a substantially similar manner to the first F core 206 described with reference to FIG. 2, and redundant description thereof may not be repeated. Similarly, the second F core 208a and the fourth F core 208b may operate in the same or a substantially similar manner to the second F core 208 described with reference to FIG. 2, and redundant description thereof may not be repeated.

As shown in FIG. 3, the workload detector may detect, individually and/or in combination, the IO intensity (e.g., IOPS) of the first F core 206a, the second F core 208a, the third F core 206b, and the fourth F core 208b, and the power manager 216 may distribute IO requests and set power/frequency modes of the first F core 206a, the second F core 208a, the third F core 206b, and the fourth F core 208b.

The first F core 206a and the second F core 208a may form a first group of F cores, and may be connected to and share control of a first group of channels CH0 . . . CH7. The third F core 206b and the fourth F core 208b may form a second group of F cores, and be connected to and share control of a second group of channels CH8 . . . CH15.

As shown in FIG. 3, the storage device 104 may include a plurality of shared memory including first shared memory 202a and second shared memory 202b. The first shared memory 202a may store a first mapping table, and be connected to the first F core 206a and the second F core 208a. The second shared memory 202b may store a second mapping table, and be connected to the third F core 206b and the fourth F core 208b. The first mapping table and the second mapping table may operate in the same or a substantially similar manner to the mapping table 220 described with reference to FIG. 2, and redundant description thereof may not be repeated. Similarly, the first shared memory 202a and the second shared memory 202b may operate in the same or a substantially similar manner to the shared memory 202 described with reference to FIG. 2, and redundant description thereof may not be repeated.

Figure 4:
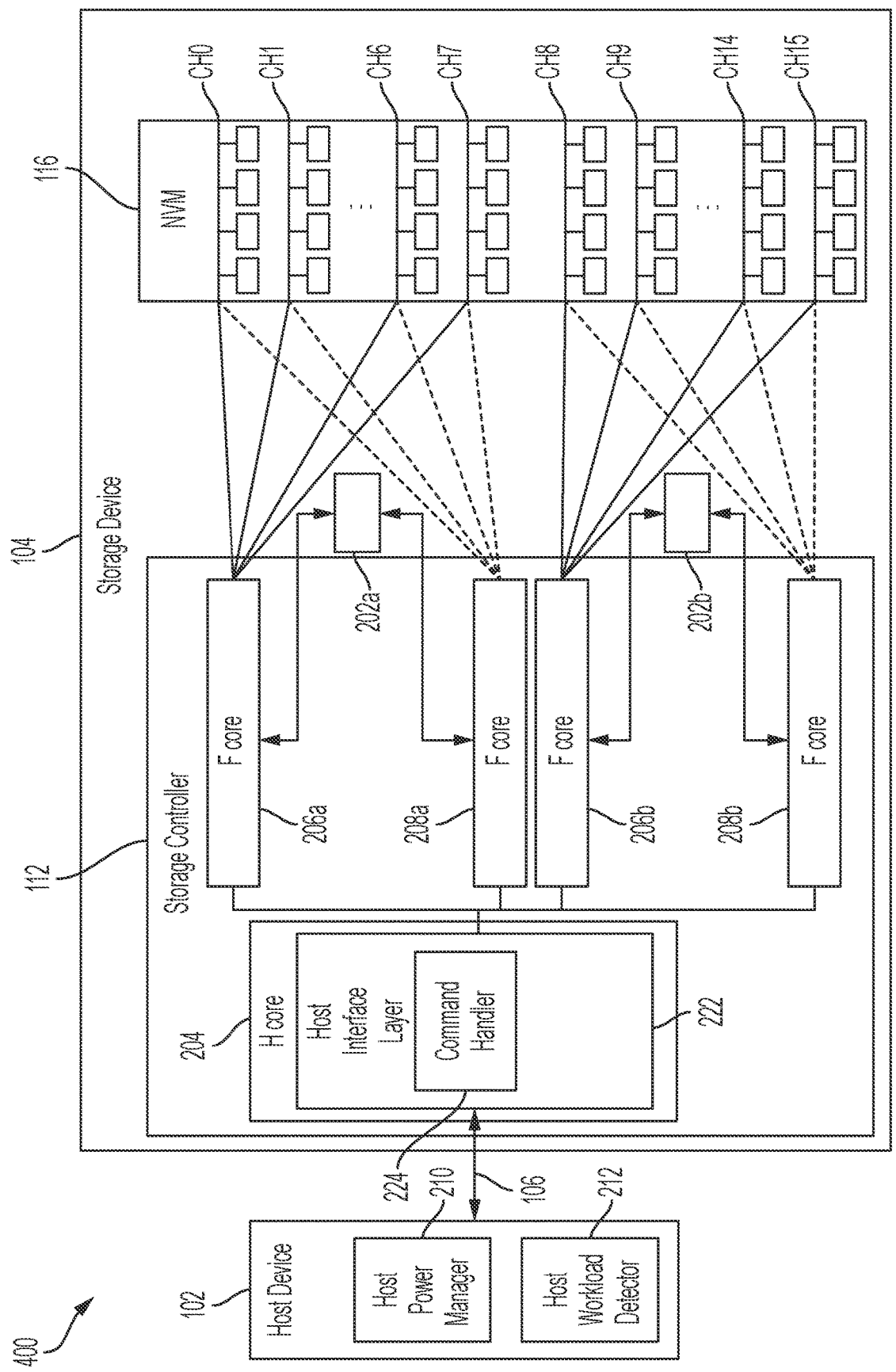
FIG. 4 illustrates a host device and a storage device included in a storage system, according to some embodiments of the present disclosure.

FIG. 4 illustrates a host device and a storage device included in a storage system 400, according to some embodiments of the present disclosure.

Referring to FIG. 4, a host device 102 may include a host power manager 210 and a host workload detector 212. The host power manager 210 and the host workload detector 212 of the host device 102 may include the detection and decision-making functions of the power manager 216 and the workload detector 218 described with reference to FIG. 2. In other words, the detection and decision-making functions of the power manager 216 and the workload detector 218 described with reference to FIG. 2 may be offloaded to the host device 102. Accordingly, redundant description thereof may not be repeated.

In this case, the storage device 104 may include a command handler 224. The command handler may transfer or transmit a command received from the host power manager 210 to one or more F cores (e.g., a first F core 206a, a second F core 208a, a third F core 206b, and/or a fourth F core 208b) to put the F cores to sleep, to change frequency/power of the F cores, or to wake up the F cores. After transmitting the command received from the host power manager 210 to the one or more F cores (e.g., a first F core 206a, a second F core 208a, a third F core 206b, and/or a fourth F core 208b), the command handler 224 may send a response to the host device 102 indicating which ones of the F cores have been set to a particular power mode (e.g., a sleep mode, awake, or operating at a set frequency). The command handler 224 may also transmit IO requests as designated by the host device 102 to particular ones of the one or more F cores (e.g., a first F core 206a, a second F core 208a, a third F core 206b, and/or a fourth F core 208b), and transmit confirmation of the IO request transmission to the host device 102.

By offloading the detection and decision-making of the workload detector 218 and/or the power manager 216 of the storage controller 112 (e.g., as shown in FIGS. 2 and 3) to the host device 102, the storage device 104 may have a smaller form factor.

In various embodiments, the command handler 224 may be a part of the storage controller 112, an accelerator, or an FPGA separate from the storage controller 112 with suitable changes to communication interfaces of the command handler 224.

Figure 5:
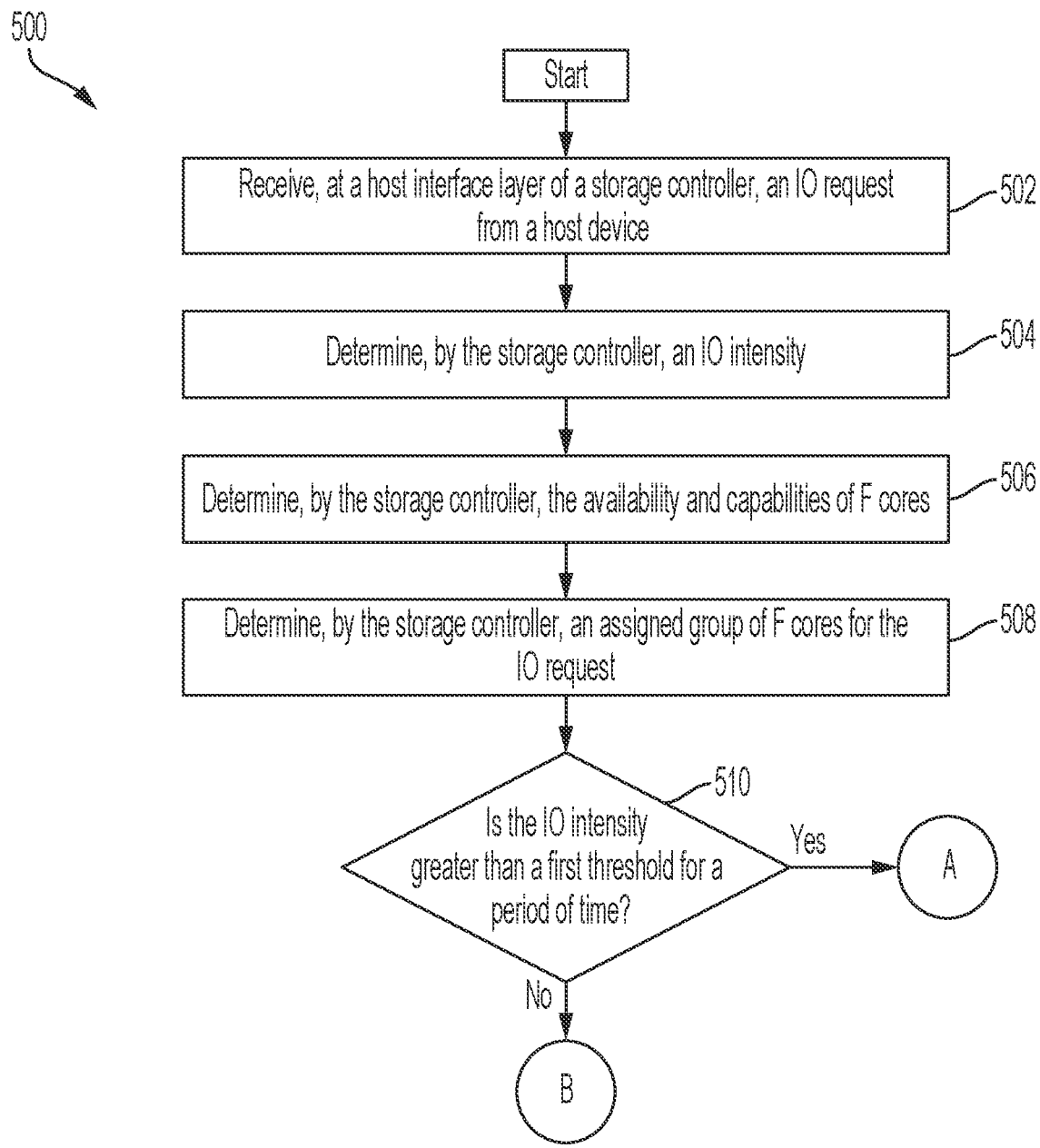
FIG. 5 illustrates a flow chart of various processes of a method of data management, according to some embodiments of the present disclosure.
Figure 6:
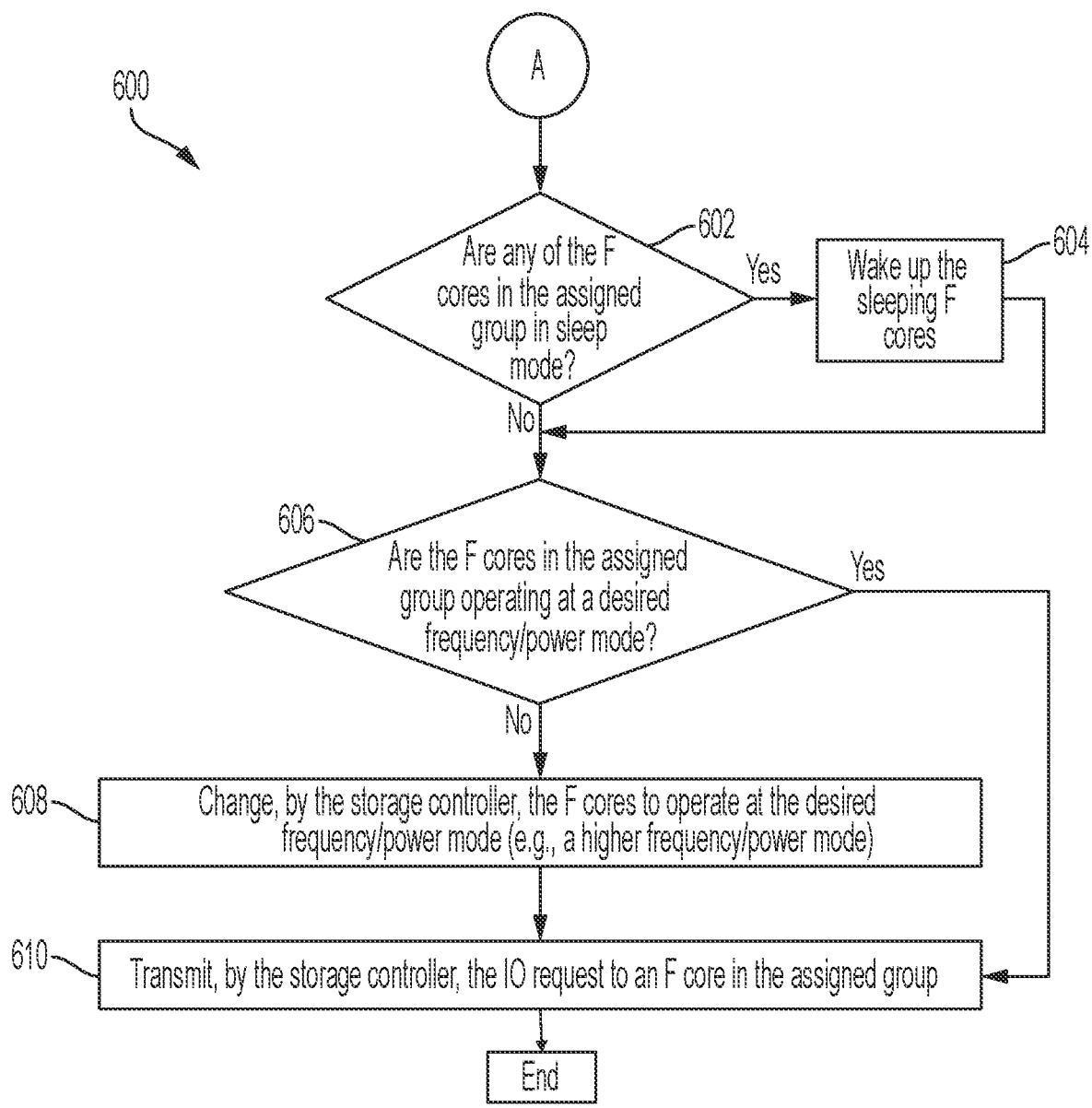
FIG. 6 illustrates a flow chart of various processes of a method of data management according to the method of FIG. 5, according to some embodiments of the present disclosure.
Figure 7B:
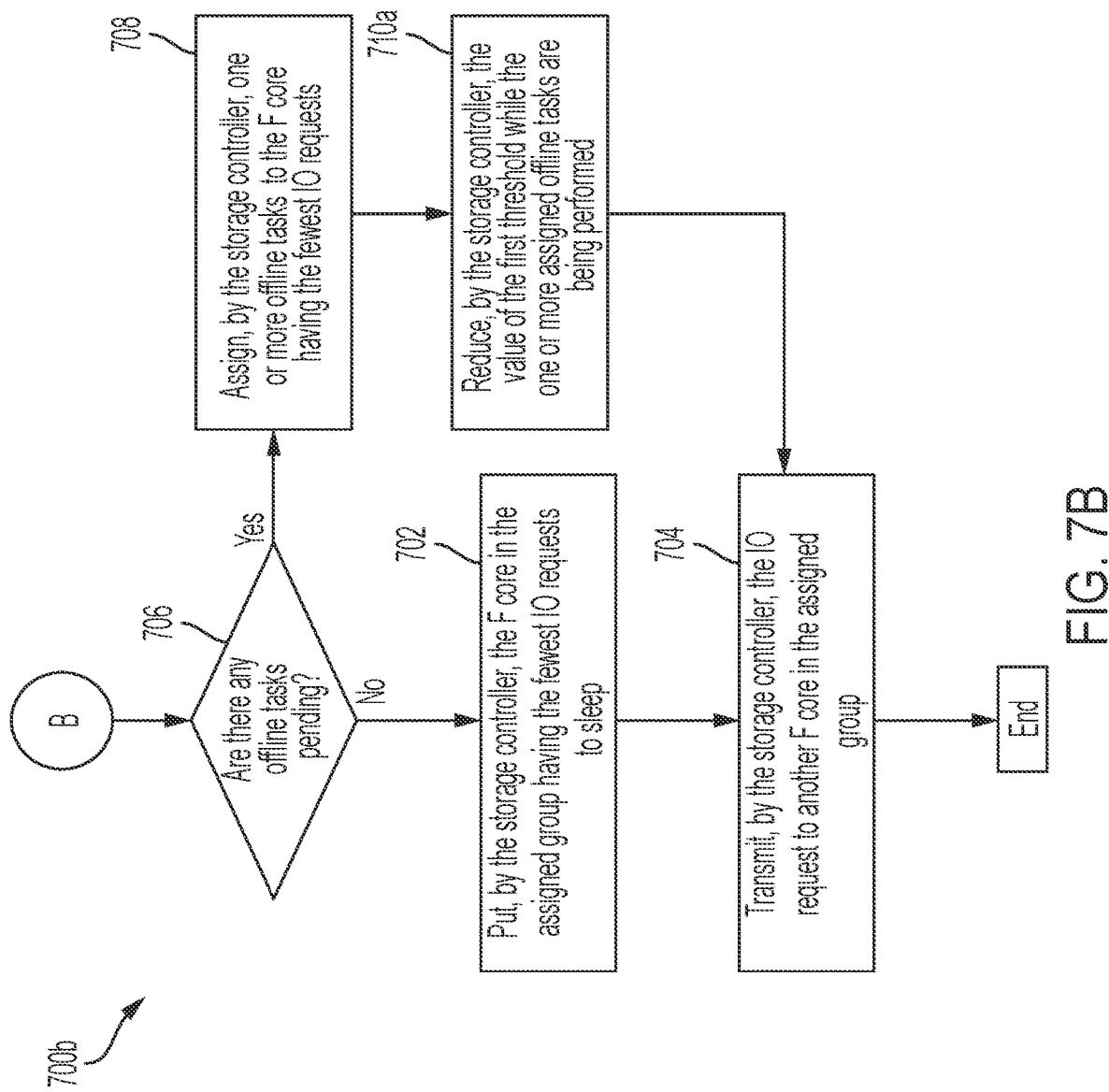
FIG. 7B illustrates a flow chart of various processes of a method of data management according to the method of FIG. 5 where pending offline tasks may be performed, according to some embodiments of the present disclosure.
Figure 7C:
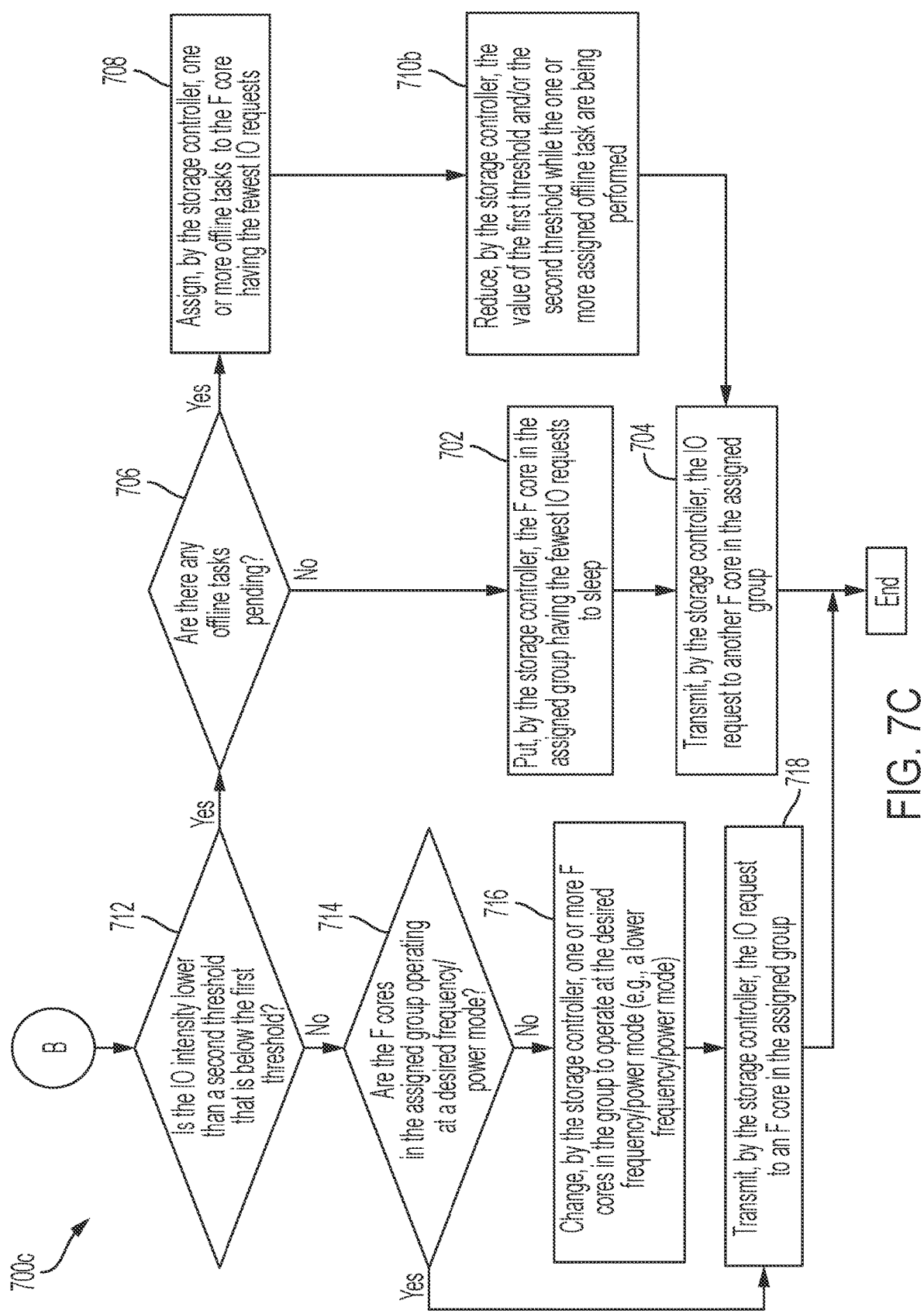
FIG. 7C illustrate flow charts of various processes of methods of data management according to the method of FIG. 5 where processors may be changed to operate at a lower frequency/power mode, according to some embodiments of the present disclosure.

FIG. 5 illustrates a flow chart of various processes of a method 500 of data management, according to some embodiments of the present disclosure. FIG. 6 illustrates a flow chart of various processes of a method 600 of data management according to the method of FIG. 5, according to some embodiments of the present disclosure. FIG. 7A illustrates a flow chart of various processes of a method of data management according to the method of FIG. 5 where a processor may be put in sleep mode, according to some embodiments of the present disclosure. FIG. 7B illustrates a flow chart of various processes of a method of data management according to the method of FIG. 5 where pending offline tasks may be performed, according to some embodiments of the present disclosure. FIG. 7C illustrate flow charts of various processes of methods of data management according to the method of FIG. 5 where processors may be changed to operate at a lower frequency/power mode, according to some embodiments of the present disclosure.

The various processes of the methods 500, 600, 700a, 700b, and 700c of data management shown in FIGS. 5-7C may be performed, for example, by the storage device 104 (e.g., the storage controller 112) of the storage systems 200 and/or 300 shown in FIGS. 2 and 3. However, the present disclosure is not limited thereto, and the operations shown in the various processes of the methods 500, 600, 700a, 700b, and 700c of data management may be performed by any suitable one of the components and elements or any suitable combination of the components and elements of one or more example embodiments described above. Further, the present disclosure is not limited to the sequence or number of the operations of the various processes of the methods 500, 600, 700a, 700b, and 700c of data management shown in FIGS. 5-7C, and can be altered into any desired sequence or number of operations as recognized by a person having ordinary skill in the art. For example, in some embodiments, the order may vary, or the various processes of the methods 500, 600, 700a, 700b, and 700c of data management may include fewer or additional operations. Further, the operations shown in the various processes of the methods 500, 600, 700a, 700b, and 700c of data management may be performed sequentially, or at least some of the operations thereof may be performed concurrently (e.g., simultaneously or substantially simultaneously).

Referring to FIG. 5, a method 500 of data management may include receiving, at the host interface layer 214 of a storage controller 112, an IO request from a host device 102 (502). The storage controller 112 (e.g., a workload detector 218) may determine an IO intensity (e.g., IOPS) when the IO request is received (504). The storage controller 112 (e.g., a power manager 216) may further determine (e.g., evaluate) the availability and capabilities of F cores (e.g., a first F core 206a, a second F core 208a, a third F core 206b, and/or a fourth F core 208b) of the storage device 104 (506).

In some embodiments, the storage controller 112 (e.g., the power manager 216) may further determine a group (or an assigned group) to receive the IO request based on the determination (e.g., evaluation) of the availability and capabilities of the F cores (508). For example, a first group of F cores may include the first F core 206a and the second F core 208a, and a second group of F cores may include the third F core 206b and the fourth F core 208b. The first group of F cores may be connected to the same channels (e.g., a first group of channels CH0 . . . CH7) as each other and the second group of F cores may be connected to the same channels (e.g., a second group of channels CH8 . . . CH15) as each other. As such, the first group of F cores and the second group of F cores may have access to different physical pages from each other to handle IO requests. Therefore, the storage controller 112 (e.g., the power manager 216) may determine whether the data access command belongs to the first group of F cores or the second group of F cores. Although the group of F cores may be connected to and share a corresponding group of channels, the storage controller 112 (e.g., the power manager 216) may logically adjust F cores within the group of F cores to control different channels of the corresponding group of channels to reduce latency overhead by, for example, avoiding or reducing flash contention.

The storage controller 112 (e.g., the power manager 216) may determine whether the IO intensity (e.g., based on IOPS determined by the workload detector) is greater than a first threshold for a period of time (510). In some embodiments, the first threshold may be a total of 10,000 IOPS for a group of F cores (e.g., a first group of F cores including the first F core 206a and the second F core 208a and/or a second group of F cores including the third F core 206b and the fourth F core 208b). However, the present disclosure is not limited thereto and any suitable threshold value may be used.

Referring to FIG. 6, in response to the storage controller 112 (e.g., the power manager 216) determining that the IO intensity is greater than a first threshold for a period of time (510), the storage controller 112 (e.g., the power manager 216) may determine whether any of the F cores in the assigned group is in sleep mode (602). In response to determining that one or more of F cores in the assigned group are in sleep mode (602), the storage controller 112 (e.g., the power manager 216) may wake up the sleeping F cores (604). Alternatively, in the case where none of the F cores in the assigned group are in sleep mode (602), the storage controller 112 (e.g., the power manager 216) may not wake up any sleeping F cores.

The storage controller 112 (e.g., the power manager 216) may further determine whether the F cores in the assigned group are operating at a desired frequency/power mode (606) (e.g., a higher frequency/power mode corresponding to the IOPS being above the first threshold). In accordance with the F cores being at the desired frequency/power mode, the storage controller 112 (e.g., the power manager 216) may transmit the IO request received from the host device (502) to an F core in the assigned group (610) in accordance with any suitable IO distribution method.

In the case where any F cores are operating at a frequency/power mode different from the desired mode, the storage controller 112 (e.g., the power manager 216) may change the F cores to operate at the desired frequency/power mode (608) (e.g., the higher frequency/power mode) and transmit the IO request received from the host device (502) to an F core in the assigned group (610) in accordance with any suitable 10 distribution method. For example, storage controller 112 (e.g., the power manager 216) may assign or transmit the IO request received from the host device to the F core in the assigned group having the fewest IO requests. In some embodiments, the storage controller 112 (e.g., the power manager 216) may, after waking up one or more F cores and/or increasing a frequency/power mode of one or more F cores, redistribute tasks from other F cores to the F cores that recently changed modes to balance the workload.

Referring to FIG. 7A, in response to the storage controller 112 (e.g., the power manager 216) determining that the IO intensity is below the first threshold for a period of time (510), the storage controller 112 (e.g., the power manager 216) may put the F core in the assigned group having the fewest IO requests to sleep (702). In this case, the storage controller 112 (e.g., the power manager 216) may redistribute the IO requests queued for the F core to be put to sleep or postpone putting the F core in sleep mode until the F core completes all of its queued IO requests. The storage controller 112 (e.g., the power manager 216) may further transmit the IO request to another F core in the assigned group (704) (e.g., an F core in the assigned group that is awake) in accordance with any suitable IO distribution method.

Referring to FIG. 7B, in some embodiments, in response to the storage controller 112 (e.g., the power manager 216) determining that the IO intensity is greater than the first threshold for a period of time (510), the storage controller 112 (e.g., the power manager 216) may further determine (e.g., consider) whether there any offline tasks (e.g., background tasks) pending (706).

In the case where no offline tasks (e.g., background tasks) pending, the storage controller 112 (e.g., the power manager 216) may put the F core in the assigned group having the fewest IO requests to sleep (702) and the storage controller 112 (e.g., the power manager 216) may transmit the IO request to another F core in the assigned group (704) (e.g., an F core in the assigned group that is awake) as described with reference to FIG. 7A.

In the case where offline tasks (e.g., background tasks) are pending, the storage controller 112 (e.g., the power manager 216) may assign one or more offline tasks (e.g., background tasks) to the F core having the fewest IO requests (708). In some embodiments, the storage controller 112 (e.g., the power manager 216) may reduce the value (e.g., reduce the IOPS value) of the first threshold while the one or more assigned offline tasks are being performed (710a), and may transmit the IO request to another F core in the assigned group (704). Accordingly, the first threshold may reflect the reduction in F cores available to process IO requests due to the F core performing one or more assigned offline tasks.

Referring to FIG. 7C, in some embodiments, in response to the storage controller 112 (e.g., the power manager 216) determining that the IO intensity is greater than the first threshold for a period of time (510), the storage controller 112 (e.g., the power manager 216) may further determine (e.g., consider) whether the IO intensity (e.g., IOPS) is lower than a second threshold that is below the first threshold (712).

As shown in FIG. 7C, in the case where the IO intensity is greater than the second threshold that is below the first threshold (712), operations or processes that are the same or substantially similar to those described above with reference to FIG. 7B may occur, and thus, redundant description thereof may not be repeated. In contrast to operation or process (710a) of FIG. 7B, the storage controller 112 (e.g., the power manager 216) may reduce the value of the first threshold and/or the second threshold while the one or more assigned offline tasks are being performed (710b). Accordingly, the first threshold and/or the second threshold may reflect the reduction in F cores available to process IO requests due to the F core performing one or more assigned offline tasks.

In the case where the IO intensity is lower than the second threshold that is below the first threshold (712), the storage controller 112 (e.g., the power manager 216) may further determine whether the F cores in the assigned group are operating at a desired frequency/power mode (714) (e.g., a lower frequency/power mode corresponding to the IOPS being above the second threshold and below the first threshold).

In accordance with the F cores being at the desired frequency/power mode, the storage controller 112 (e.g., the power manager 216) may transmit the IO request received from the host device (502) to an F core in the assigned group (718) in accordance with any suitable IO distribution method.

In the case where the desired frequency/power mode is set at a mode other than the desired mode, the storage controller 112 (e.g., the power manager 216) may change one or more F cores in the group to operate at the desired frequency/power mode (716) (e.g., a lower frequency/power mode corresponding to IOPS being below the second threshold), and transmit the IO request received from the host device (502) to an F core in the assigned group (718) in accordance with any suitable IO distribution method.

Figure 8:
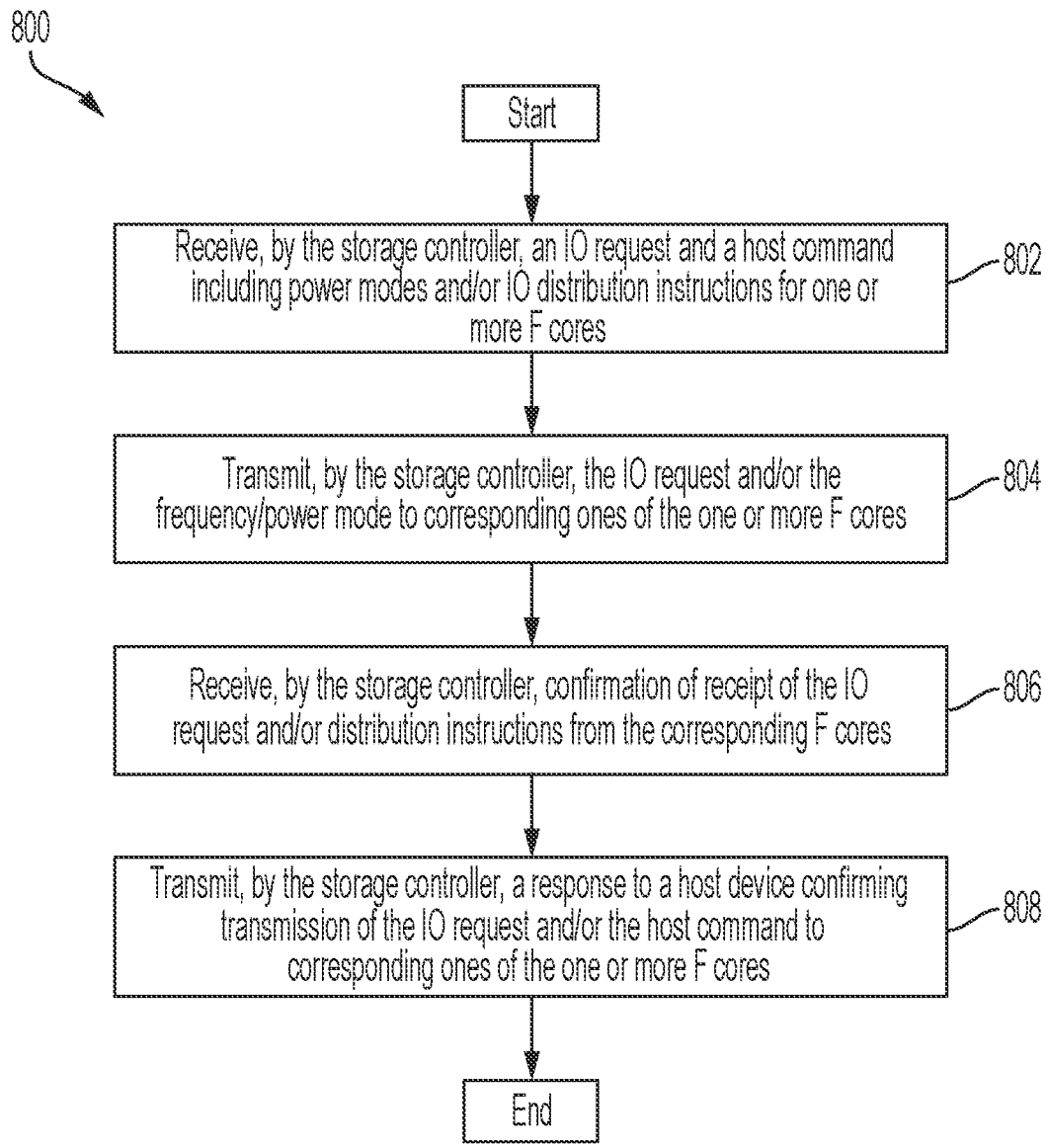
FIG. 8 illustrates a flow chart of a method of handling commands from a host device, according to some embodiments of the present disclosure.

FIG. 8 illustrates a flow chart of a method 800 of handling commands from a host device, according to some embodiments of the present disclosure.

The method 800 of handling commands from a host device shown in FIG. 8 may be performed, for example, by the storage device 104 (e.g., the storage controller 112) of the storage system 400 shown in FIG. 4. However, the present disclosure is not limited thereto, and the operations shown in the method 800 of data management may be performed by any suitable one of the components and elements or any suitable combination of the components and elements of those of one or more example embodiments described above. Further, the present disclosure is not limited to the sequence or number of the operations of the method 800 shown in FIG. 8, and can be altered into any desired sequence or number of operations as recognized by a person having ordinary skill in the art. For example, in some embodiments, the order may vary, or the method 800 may include fewer or additional operations. Further, the operations shown in the method 800 may be performed sequentially, or at least some of the operations thereof may be performed concurrently (e.g., simultaneously or substantially simultaneously).

The method 800 of handling commands from the host device may include receiving, by the storage controller 112 (e.g., a command handler 224), an IO request and/or a host command including power modes and/or IO distribution instructions for one or more F cores (802).

The method 800 may further include transmitting, by the storage controller 112 (e.g., the command handler 224), the IO request and the frequency/power mode to corresponding ones of the one or more F cores (804).

The method 800 may further include receiving, by the storage controller 112 (e.g., the command handler 224), confirmation of receipt of the IO request and/or distribution instructions from the corresponding F cores (806), and the storage controller 112 (e.g., the command handler 224) may transmit a response to a host device 102 confirming transmission of the IO request and/or the host command to corresponding ones of the one or more F cores (808).

Accordingly, the detection and decision-making functions of the power manager 216 and the workload detector 218 may be offloaded to the host device 102 and the storage device 104 may have a smaller form factor by using the command handler 224 instead of fully incorporating a power manager 216 and/or a workload detector 218 into the storage device 104.

According to some embodiments of the present disclosure, a storage device includes a workload detector, a power manager, and/or a command handler to improve power-efficiency, resource utilization, and dynamically manage IO operations. Further, according to some embodiments of the present disclosure, the power manager determines suitable frequency/power modes for one or more cores based on a user configuration, core capabilities and available power modes, user IO traffic and learnt thresholds, offline tasks, and/or if another hardware automation route is available to serve a user request.

While various methods according to some embodiments of the present disclosure has been described according to various processes having a certain process order, the present disclosure is not limited thereto. For example, when a certain embodiment may be implemented differently, a specific process order may be different from the described order. For example, two consecutively described processes may be performed at the same or substantially at the same time, or may be performed in an order opposite to the described order.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "some embodiments of the present disclosure." As used herein, the terms "use," "using," and "used" may be considered synonymous with the terms "utilize," "utilizing," and "utilized," respectively.

The electronic or electric devices and/or any other relevant devices (e.g., the storage controller, the shared memory, and the host device) or components thereof (e.g., an H core and a controller processor or F Core) according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, RAM. The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Although some example embodiments have been described, those skilled in the art will readily appreciate that various modifications are possible in the example embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific example embodiments disclosed herein, and that various modifications to the disclosed example embodiments, as well as other example embodiments, are intended to be included within the spirit and scope of the present disclosure as defined in the appended claims, and their equivalents.

What is claimed is:

1. A storage device comprising:
   non-volatile memory;
   a storage controller comprising:
      a first controller processor connected to the non-volatile memory; and
      a second controller processor connected to the non-volatile memory; and
   shared memory to store a mapping table, the shared memory being connected to the first controller processor and the second controller processor,
   wherein the first controller processor is configured to make a first update to the mapping table based on a first command, and the second controller processor is configured to make a second update to the mapping table based on a second command, wherein the first update includes storing a first mapping of a first logical address to a first physical address, and the second update includes storing a second mapping of a second logical address to a second physical address,
   wherein the storage controller is configured to change a power mode of the first controller processor from a first power mode to a second power mode based on an input/output (TO) intensity, and
   wherein an IO request directed for the first controller processor is transferred to the second controller processor, and data corresponding to the IO request is stored at the non -volatile memory based on information in the mapping table;
   wherein the storage controller is further configured to change a first number of channels associated with the first controller processor and a second number of channels associated with the second controller processor 2. The storage device of claim 1, wherein the non-volatile memory comprises:
   a first memory chip connected to a first channel; and
   a second memory chip connected to a second channel, and
   wherein the first controller processor and the second controller processor are connected to the first memory chip via the first channel and the second memory chip via the second channel.

3. The storage device of claim 2, wherein the storage controller is further configured to adjust the first channel and the second channel controlled by the first controller processor and the second controller processor.

4. The storage device of claim 1, wherein the IO intensity corresponds to IO per second (IOPS).

5. The storage device of claim 4, wherein the storage controller is further configured to put the first controller processor or the second controller processor in a state in which activities are suspended to save power or a lower frequency mode in response to the IOPS being below a first threshold.

6. The storage device of claim 5, wherein the storage controller is further configured to put a selected controller processor having a lower number of queued IO requests from among the first controller processor and the second controllerprocessor in the state in which activities are suspended to save power or the lower frequency mode in response to IOPS being below the first threshold.

7. The storage device of claim 4, wherein the storage controller is further configured to assign a background task to the first controller processor in response to IOPS being below a first threshold.

8. The storage device of claim 7, wherein the storage controller is further configured to reduce the first threshold in response to assigning the background task to the first controller processor.

9. The storage device of claim 1, wherein the storage controller is configured to set the power mode of the first controller processor and the second controller processor based on IO intensity in accordance with a command received from a power manager of a host based on the IO intensity detected by a workload detector of the host.

10. A method of data management, the method comprising:
   receiving, at a host interface layer of a storage controller, an IO request from a host device;
   determining, by the storage controller, an IO intensity;
   determining, by the storage controller, a group of controller processors for the IO request, the group of controller processors being connected to non-volatile memory corresponding to the IO request and being connected to shared memory to share a mapping table;
   receiving, by a first controller processor from among the group of controller processors, a first command;
   making a first update, by the first controller processor, to the mapping table based on the first command, wherein the first update includes storing a first mapping of a first logical address to a first physical address;
   receiving, by a second controller processor from among the group of controller processors, a second command;
   making a second update, by the second controller processor, to the mapping table based on the second command, wherein the second update includes storing a second mapping of a second logical address to a second physical address;
   changing, by the storage controller from a first power mode, a first controller processor from among the group of controller processors to operate at a second power mode based on the IO intensity; and transferring the IO request from the first controller processor to a second controller processor, wherein data corresponding to the IO request is stored at the non-volatile memory based on information in the mapping table, wherein the storage controller is further configured to change a first number of channels associated with the first controller processor and a second number of channels associated with the second controller processor.

11. The method of claim 10, wherein the first controller processor and a second controller processor of the group of controller processors are connected to a first memory chip of the non-volatile memory via a first channel and a second memory chip of the non-volatile memory via a second channel.

12. The method of claim 11, the method further comprising:
adjusting, by the storage controller, the first channel and the second channel controlled by the first controller processor and the second controller processor.

13. The method of claim 10, wherein the IO intensity corresponds to IOPS.

14. The method of claim 13, the method further comprising:
putting, by the storage controller, the first controller processor or the second controller processor of the group of controller processors in a state in which activities are suspended to save power or a lower frequency mode in response to IOPS being below a first threshold.

15. The method of claim 14, wherein the putting, by the storage controller, the first controller processor or the second controller processor in the state in which activities are suspended to save power or the lower frequency mode in response to TOPS being below the first threshold comprises putting a selected controller processor having a lower number of queued IO requests from among the first controller processor and the second controller processor in the state in which activities are suspended to save power or the lower frequency mode.

16. The method of claim 13, the method further comprising:
assigning, by the storage controller, a background task to the first controller processor of the group of controller processors in response to IOPS being below a first threshold.

17. The method of claim 16, the method further comprising:
reducing, by the storage controller, the first threshold in response to the assigning, by the storage controller, the background task to the first controller processor.

18. A storage device comprising:
non-volatile memory;
a first controller processor connected to the non-volatile memory;
a second controller processor connected to the non-volatile memory;
a workload detector configured to detect IO intensity;
a power manager configured:
to change a power mode of the first controller processor from a first power mode to a low power mode based on the IO intensity,
to change the first controller processor and the second controller processor to operate in the low power mode in response to the workload detector detecting an IO intensity between a first threshold and a second threshold for a first period of time, the second threshold being lower than the first threshold,
to put the first controller processor in a state in which activities are suspended to save power in response to the workload detector detecting the TO intensity below the second threshold for a second period of time different from the first period of time,
to change a first number of channels associated with the first controller processor and a second number of channels associated with the second controller processor, and
to transfer an TO request directed for the first controller processor to the second controller processor; and
shared memory to store a mapping table, the shared memory being connected to the first controller processor and the second controller processor to share mapping table information between the first controller processor and the second controller processor,
wherein the first controller processor is configured to make a first update to the mapping table based on a first command, and the second controller processor is configured to make a second update to the mapping table based on a second command, wherein the first update includes storing a first mapping of a first logical address to a first physical address, and the second update includes storing a second mapping of a second logical address to a second physical address,
wherein data corresponding to the TO request is stored at the non-volatile memory based on information in the mapping table.

* * * * *